(12) United States Patent
Mainini et al.

(10) Patent No.: US 9,373,260 B2
(45) Date of Patent: Jun. 21, 2016

(54) VISUAL LOCATING DEVICE FOR A MOTOR VEHICLE

(71) Applicant: FCA Italy S.p.A., Turin (IT)

(72) Inventors: Andrea Mainini, Turin (IT); Antonio Erario, Turin (IT)

(73) Assignee: FCA Italy S.p.A., Turin (IT)

( * ) Notice: Subject to any disclaimer, the term of this patent is extended or adjusted under 35 U.S.C. 154(b) by 0 days.

(21) Appl. No.: 14/432,981

(22) PCT Filed: Oct. 3, 2013

(86) PCT No.: PCT/IB2013/059099
§ 371 (c)(1),
(2) Date: Apr. 1, 2015

(87) PCT Pub. No.: WO2014/054020
PCT Pub. Date: Apr. 10, 2014

(65) Prior Publication Data
US 2015/0254980 A1  Sep. 10, 2015

(30) Foreign Application Priority Data
Oct. 3, 2012 (IT) ............................. TO2012A0862

(51) Int. Cl.
*G08G 1/123* (2006.01)
*B60Q 1/48* (2006.01)
*G08B 5/36* (2006.01)

(52) U.S. Cl.
CPC ............. *G08G 1/123* (2013.01); *B60Q 1/482* (2013.01); *G08B 5/36* (2013.01)

(58) Field of Classification Search
CPC ........ B60Q 1/482; B60Q 1/2657; G08B 1/08; G08B 1/205; G08B 5/36; G08B 5/38
USPC ............. 340/539.1, 539.11, 539.32, 425.5, 340/426.22, 426.23, 825.49, 825.69, 932.2; 116/28 R, 173; 342/133, 146; 701/208, 701/213
See application file for complete search history.

(56) References Cited

U.S. PATENT DOCUMENTS

| | | | |
|---|---|---|---|
| 3,506,956 A | 4/1970 | Kolm et al. | |
| 4,011,443 A * | 3/1977 | Smith | B62J 6/00 340/432 |
| 4,797,671 A * | 1/1989 | Toal, Jr. | G01S 13/74 340/12.5 |
| 5,933,081 A | 8/1999 | Jones | |
| 6,580,368 B1 * | 6/2003 | Jacobs | B60Q 1/482 116/209 |
| 7,369,061 B1 | 5/2008 | Sellers et al. | |
| 2004/0164861 A1 * | 8/2004 | Rawson | G08B 5/36 340/539.32 |

FOREIGN PATENT DOCUMENTS

| | | |
|---|---|---|
| DE | 20 2006 009 591 U1 | 11/2006 |
| DE | 20 2011 004 301 U1 | 9/2011 |
| WO | WO 99/42325 A1 | 8/1999 |

* cited by examiner

*Primary Examiner* — Hung T Nguyen
(74) *Attorney, Agent, or Firm* — Blank Rome LLP

(57) ABSTRACT

A visual locating device for a motor vehicle, comprising a light signal generator coupleable with an antenna of the motor vehicle, and electronic control means responsive to an activation/setting command to control the light signal generator to cause emission of a light signal suitable to enable visually locating said motor vehicle. The electronic control means comprise user-controllable setting means to set a light emission mode of the light signal generator.

4 Claims, 2 Drawing Sheets

VISUAL LOCATING DEVICE FOR A MOTOR VEHICLE

TECHNICAL FIELD OF INVENTION

The present invention relates to a visual locating device for a motor vehicle, in particular a passenger car.

STATE OP THE ART

U.S. Pat. No. 6,239,701 describes a visual locating device for a motor vehicle, which can be combined with anantenna of the motor vehicle's radio system to emit, when activated, a flashing light signal in order to facilitate visually locating the motor vehicle within a search area, for example, in a car park.

Examples of similar devices are described in U.S. Pat. Nos. 5,933,091 and 6,580,368.

U.S. Pat. No. 7,119,679 describes a visual locating device for a motor vehicle in which a spherical body made of a transparent material and housing a light source can be coupled with the tip of the antenna of a motor vehicle's radio system; the light source can be activated by means of a wireless command generated by a remote control to produce a light signal suitable to enable locating the motor vehicle.

In addition, a device for generating a sound signal is available within the body of the motor vehicle, for example inside the engine compartment, and can also be activated remotely by means of a remote control, which can enable the generation of just the sound signal or a sound and light signal.

European Patent EP 1 630 051 describes a solution similar to that described in U.S. Pat. No. 7,119,679, in which the signalling unit that can be coupled with the antenna of a motor vehicle's radio system can be activated remotely by means of a remote control and is able to generate a light and sound signal.

Known types of visual location devices generate a light signal having fixed characteristics, for example intensity and/or duration. However, in many environmental conditions this signal is not suitable to allow easy identification of the motor vehicle: consider, for example, a light signal that can be suitable in certain lighting conditions, but insufficient in situations of high brightness.

Thus, the need is felt to provide a visual locating device for a motor vehicle that solves the problems of the known art.

The problems pointed out in the solution described in European Patent EP 1 630 051 are similar to those described with reference to U.S. Pat. No. 7,119,679.

Furthermore, the light source described in U.S. Pat. No. 7,119,679 is a normal incandescent light bulb mounted in a socket housed inside the spherical body. This structure comprises metal parts that can magnetically interfere with the original structure of the antenna, deteriorating its performance.

In addition, the connection between the transparent plastic body and the tip of the antenna is not stable and the plastic body can come loose from the antenna, for example, due to vibrations transmitted by the motor vehicle and/or the waving movement of the antenna due to the motor vehicle moving forward. This constitutes a further technical problem of the known art.

SUBJECT AND ABSTRACT OF THE INVENTION

The object of the present invention is that of providing a visual locating device for a motor vehicle, in particular a passenger car, which overcomes the drawbacks of the known art.

The foregoing object is achieved by the present invention insofar as it relates to a visual locating device for a motor vehicle, as defined in the appended claims.

DETAILED DESCRIPTION OF PREFERRED EMBODIMENTS OF THE INVENTION

The present invention will now be described in detail with reference to the attached figures to enable an expert in the field to embody it and use it. Various modifications to the described embodiments will be immediately obvious to experts in the field, and the generic principles described herein can be applied to other embodiments and applications without departing from the scope of the present invention, as defined in the appended claims. Therefore, the present invention should not be considered as limited to the embodiments set forth herein, but is to be accorded the widest scope consistent with the principles and features disclosed and claimed herein.

Figure 1:
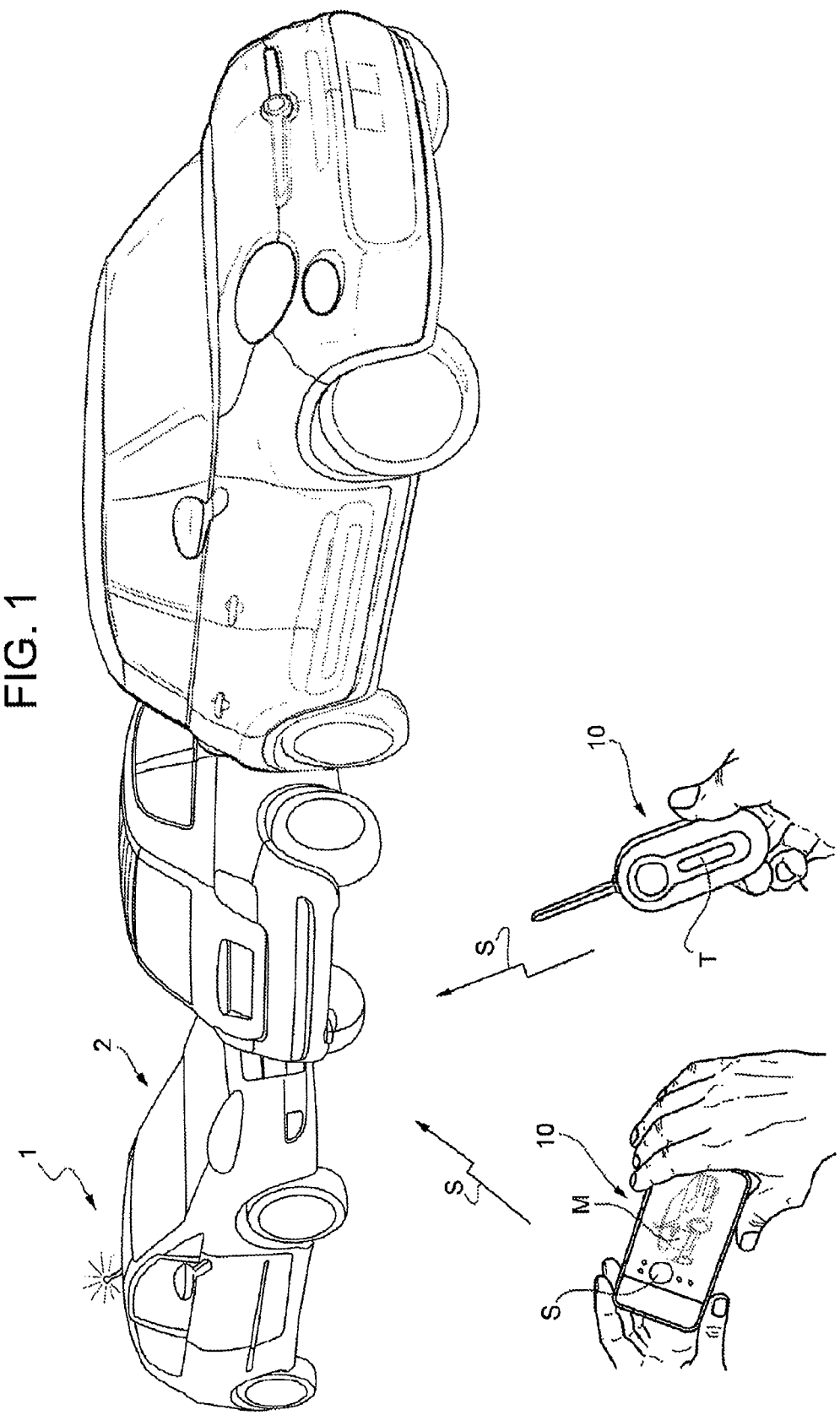
FIG. 1 schematically shows the use of a visual locating device for a motor vehicle according to the present invention.
Figure 3:
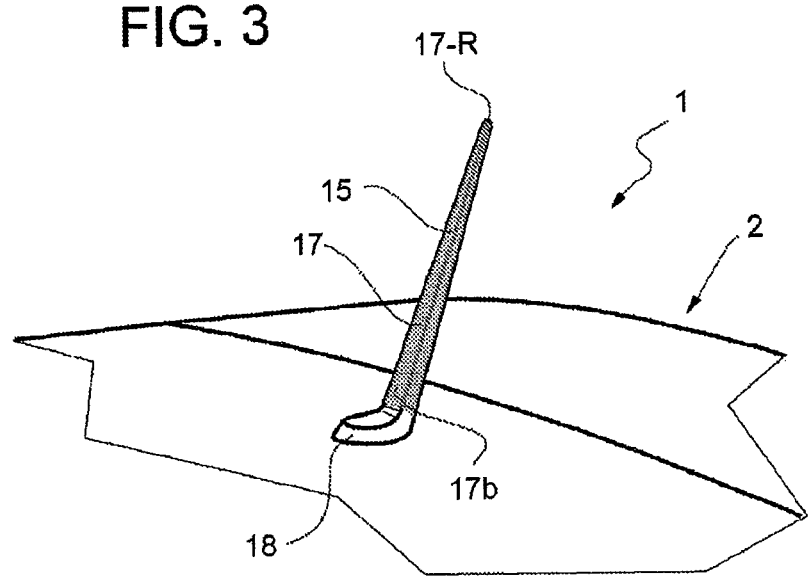
FIG. 3 shows the mechanical structure of the device in FIG. 1.
Figure 2:
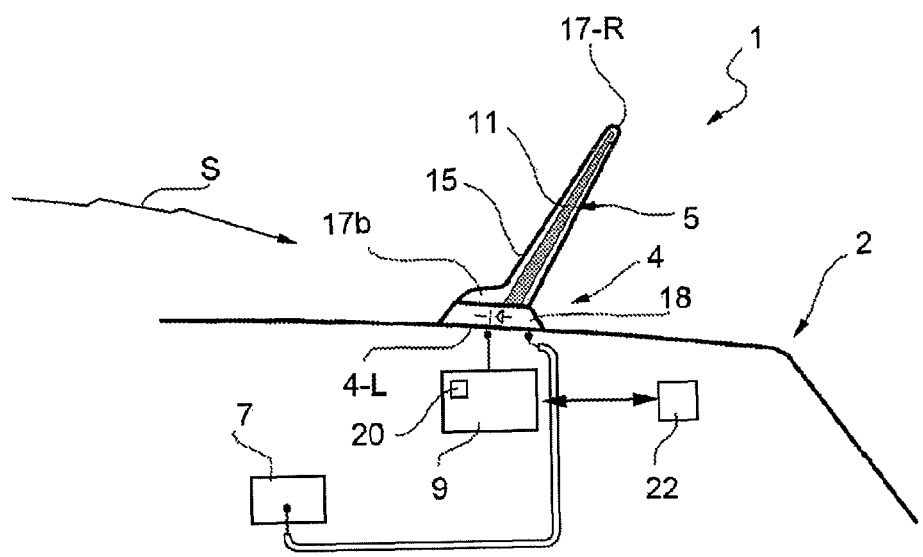
FIG. 2 shows the wiring diagram of the device in FIG. 1 in greater detail.

In FIG. 1, reference numeral 1 indicates, as a whole, a visual locating device for a motor vehicle 2, in particular a passenger car (schematically and partially shown in FIGS. 2 and 3).

The locating device 1 comprises:
- a light signal generator 4 coupled to an external antenna 5, of known type, of a radio system 7 of the motor vehicle 2; and
- a control circuit 9 operable to control, in response to an activation command S, the light signal the generator 4 to cause the latter to emit a light signal to facilitate visually locating the motor vehicle 2 (see FIG. 1).

Typically, the antenna 5 extends upwards from the roof of the motor vehicle's body and comprises a straight elongated insulating element 11 containing the circuit portion of the antenna (of known type and not shown for simplicity).

In the example described, the light signal generator 4 comprises a plurality of LEDs (light emitting diodes) 4-L powered by a driving circuit (of known type and not shown for simplicity), and a waveguide 15 coupled to the antenna 5 to receive the optical signal generated by the LEDS 4-L. The waveguide 15 is made of a transparent material so that the optical signal generated by the LEDS 4-L is fed to the inlet of the waveguide 15 and enables the illumination of at least part of the waveguide 15, providing the aforementioned visual indication.

The optical signal can provide illumination for the entire length of the waveguide or illuminate one or more portions of the waveguide, for example, an end portion.

The waveguide 15 is made of a synthetic material and does not interfere with the electromagnetic structure of the antenna 5. Furthermore, even the LEDs 4-L do not effectively comprise materials that could cause electromagnetic interference with the antenna 5.

In this way, the problems of electromagnetic compatibility of devices pertaining to the known art are overcome.

Furthermore, the visual locating device 1 is extremely simple, robust, inexpensive and not subject to deterioration.

In the example shown, the waveguide 15 comprises a single straight element 17, made of a synthetic material, which extends along the antenna 5 parallel to the axis of antenna 5 and incorporates the antenna 5.

Alternatively, the waveguide 15 can be coupled externally to the antenna 5; in this case, the antenna 5 is not contained inside the element made of a plastic material, which can be fastened to the antenna 5 by means of known connection systems, for example, snap-fit systems.

Furthermore, unlike that shown, the waveguide 5 can have longitudinal dimensions smaller than those of the antenna 5, extending for just a section of the antenna 5.

The straight element 17 of the waveguide 15 has a widened base portion 17-B fastened to the motor vehicle's body by a base plate 18 and a tapered tip portion 17-R. The base plate 18 can conveniently house the control circuit 9 and the LEDs 4-L.

According to the present invention, the control circuit 9 comprises a set-up circuit 20 (FIG. 2) for selection and adjustment of the light emission modes of the generator 4.

The set-up circuit 20 is able to modify at least one of the following settings:
- the emission colour of the light signal generated by the LEDs 4-L (i.e. several colours can be selected);
- the flash frequency of the light signal generated by the LEDs 4-L (i.e. several frequencies can be selected);
- the number of flashes of the light signal generated by the LEDs 4-L (i.e. the length of the light signal is adjustable); and
- the intensity of the light signal generated by the LEDs 4-L (i.e. the intensity of the light signal is adjustable).

In this way, it is possible to change the characteristics of the light signal that facilitates locating the motor vehicle so that they are better suited to the environment where the motor vehicle is located.

In motor vehicles equipped with an infotelematic system and/or infotainment system, the functions of the set-up circuit 20 are conveniently implemented by the infotelematic system and/or infotainment system and can be activated both remotely by means of a remote control 10 and locally by means of the user interface of the infotelematic system and/or infotainment system.

Conveniently, the remote control 10 can be implemented by means of a user's mobile phone and, consequently, the control circuit 9 is interfaced with an onboard receiver device 22 capable of communicating with the mobile phone.

In particular, by using remote control implemented via a mobile phone of the smart-phone type (FIG. 1), it is possible to control an application for activating the visual locating device 1 (icon "M") and setting the parameters (icon "S").

In alternative, the remote control 10 could be integrated in the ignition key 10 of the motor vehicle. In this case, the key 10 could be provided with a specific button "T" for generating the activation signal of the visual locating device 1.

The invention claimed is:

1. A visual locating device for a motor vehicle, comprising:
an optoelectronic light signal generator operable to emit a light signal; and
an electronic control system responsive to activation/setting commands to accordingly control the optoelectronic light signal generator to cause emission of a light signal suitable to enable visually locating the motor vehicle;
wherein the optoelectronic light signal generator comprises:
an optoelectronic light source operable to generate a light signal, and
a waveguide configured to be mechanically coupleable with an external antenna of the motor vehicle to extend along at least part of the external antenna;
wherein the waveguide is configured to either enclose or be externally fastenable to, at least part the antenna,
wherein the waveguide is made of optically transparent, electromagnetically compatible material and is configured to be optically coupleable with the optoelectronic light source to receive a light signal therefrom and, resultingly, be at least partially illuminated thereby,
wherein the electronic control system is further configured to allow the following settable quantities of the light signal generated by the optoelectronic light signal generator to be set both on the motor vehicle and remotely therefrom:
light color,
light intensity;
light flash frequency, and
number of light flashes,
wherein the electronic control system is further configured to allow the user-settable quantities to be set via:
an on-vehicle user interface, and
a personal communication device;
and wherein the electronic control system is further configured to allow the optoelectronic light signal generator to be remotely activated via:
a remote control integrated in an ignition key of the motor vehicle, and
a personal communication device.

2. The visual locating device of claim 1, wherein the waveguide comprises a substantially straight element with a widened base portion configured to be fastenable to a body part of the motor vehicle via a base plate where the optoelectronic light source and an associated electronic control circuit are housed.

3. The visual locating device of claim 1, wherein the optoelectronic light source comprises a number of light emitting diodes.

4. A motor vehicle comprising an external antenna and a visual locating device according to claim 1.

* * * * *